G. W. DALLIMORE.
JOURNAL BOX FOR ROLLER BEARINGS.
APPLICATION FILED JUNE 9, 1919.

1,358,420.

Patented Nov. 9, 1920.
4 SHEETS—SHEET 2.

Inventor
G. W. Dallimore
By Brock & Smith
Attorney

G. W. DALLIMORE.
JOURNAL BOX FOR ROLLER BEARINGS.
APPLICATION FILED JUNE 9, 1919.
1,358,420.
Patented Nov. 9, 1920.
4 SHEETS—SHEET 3.
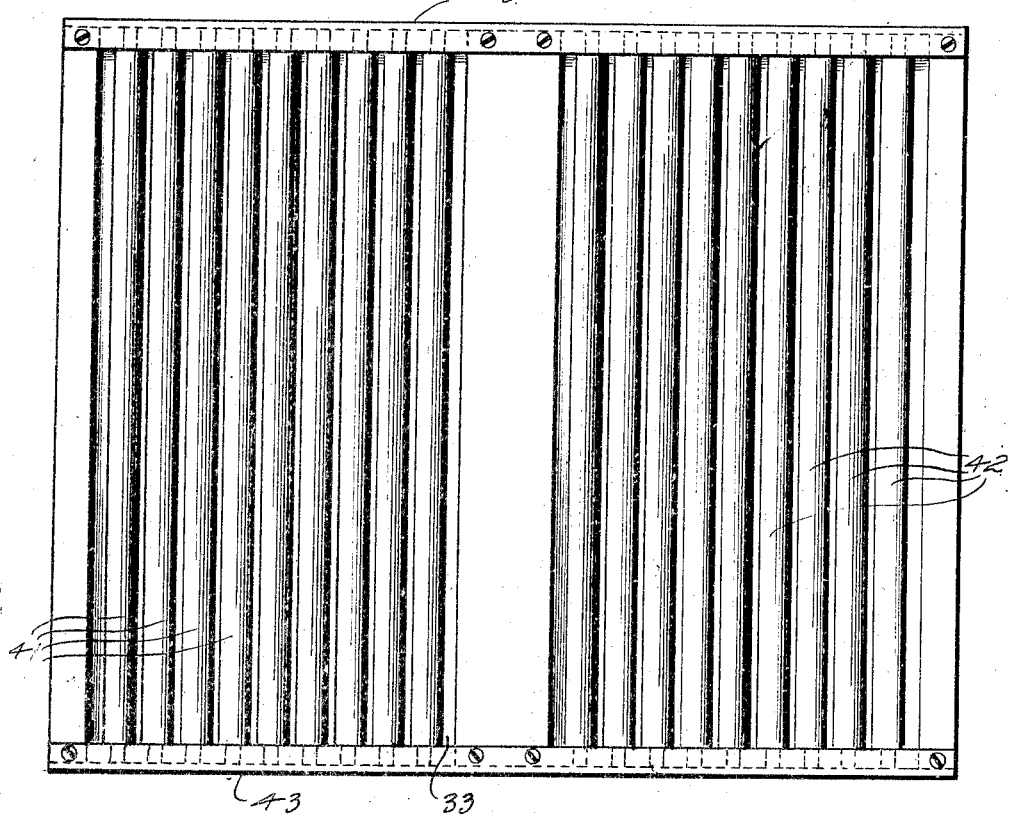
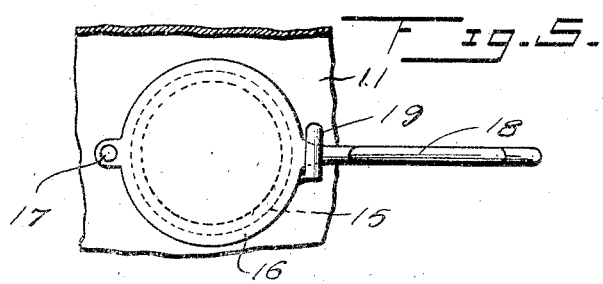
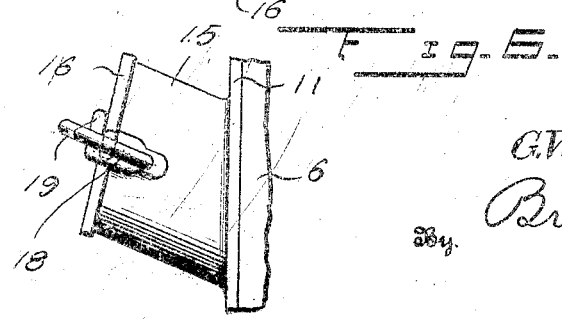
Inventor
G. W. Dallimore,
By Brock & Smith
Attorney G. W. DALLIMORE.
JOURNAL BOX FOR ROLLER BEARINGS.
APPLICATION FILED JUNE 9, 1919.
1,358,420.
Patented Nov. 9, 1920.
4 SHEETS—SHEET 4.
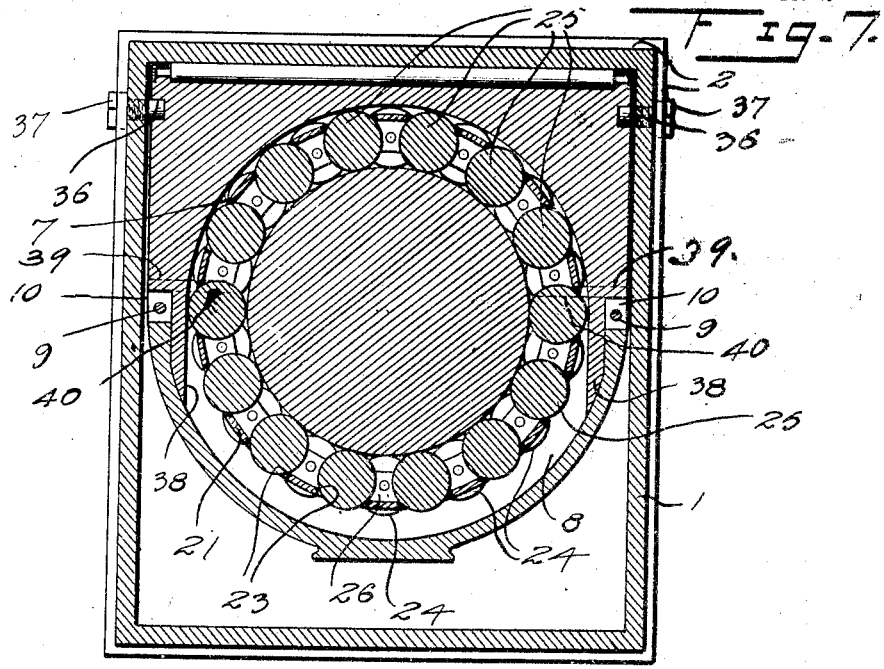
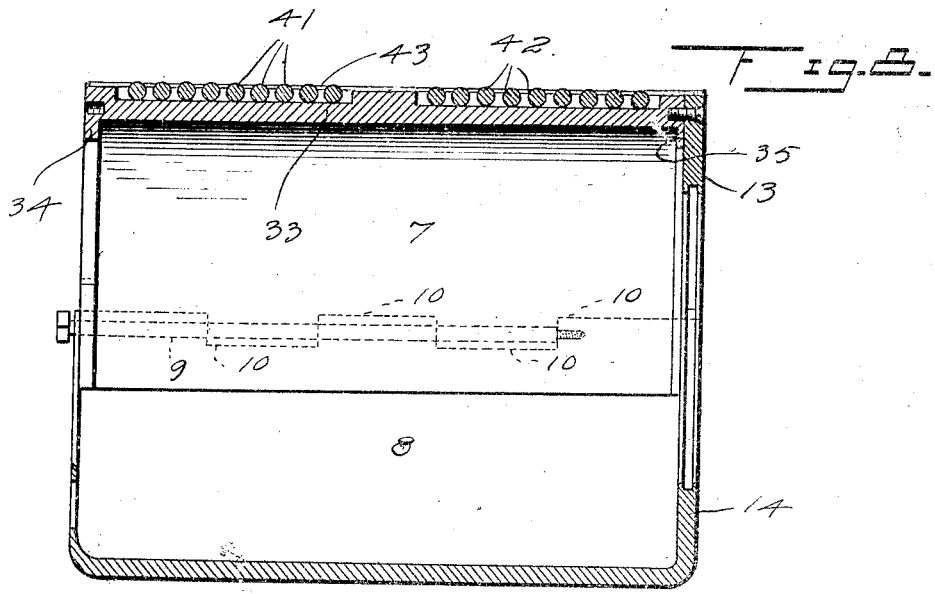
Inventor
G. W. Dallimore,
By Brock & Smith
Attorney

UNITED STATES PATENT OFFICE.

GEORGE W. DALLIMORE, OF OAKLAND, CALIFORNIA.

JOURNAL-BOX FOR ROLLER-BEARINGS.

1,358,420.    Specification of Letters Patent.    Patented Nov. 9, 1920.

Application filed June 9, 1919. Serial No. 302,948.

*To all whom it may concern:*

Be it known that I, GEORGE W. DALLIMORE, a citizen of the United States, residing at Oakland, in the county of Alameda and State of California, have invented new and useful Improvements in Journal-Boxes for Roller-Bearings, of which the following is a specification.

The present invention is designed particularly for providing an improved roller bearing journal box for cars in use on street railways, interurban roads, or steam railroads, and the invention resides essentially in the utilization of the roller bearing device in lieu of the usual solid bearing of this type involving the use of the brass and key bearing elements.

The invention also contemplates an improved form of oil or lubricant box or cell inclosing the bearing members about the journal of the axle in order that the bearing member may be continuously supplied with lubricant or oil and which may be applied to the journal or withdrawn therefrom with facility. Other meritorious features of the invention will be described and claimed in the following specification, and in the accompanying drawings I have illustrated one complete example of the physical embodiment of my invention, the parts being constructed and combined according to the best mode I have so far devised for the practical application of the principles of the invention.

Fig. 4 is a top plan view of the longitudinal roller bearing on top of the oil cell or box, parts being omitted.

Fig. 5 is a front detail view of the spout and closure of the oil cell, and Fig. 6 is a side view in detail of the spout and closure.

Fig. 7 is a transverse sectional view of the box, bearing and cell, on line 7—7 of Fig. 1.

Fig. 8 is a longitudinal, sectional view of the oil cell.

Figure 1:
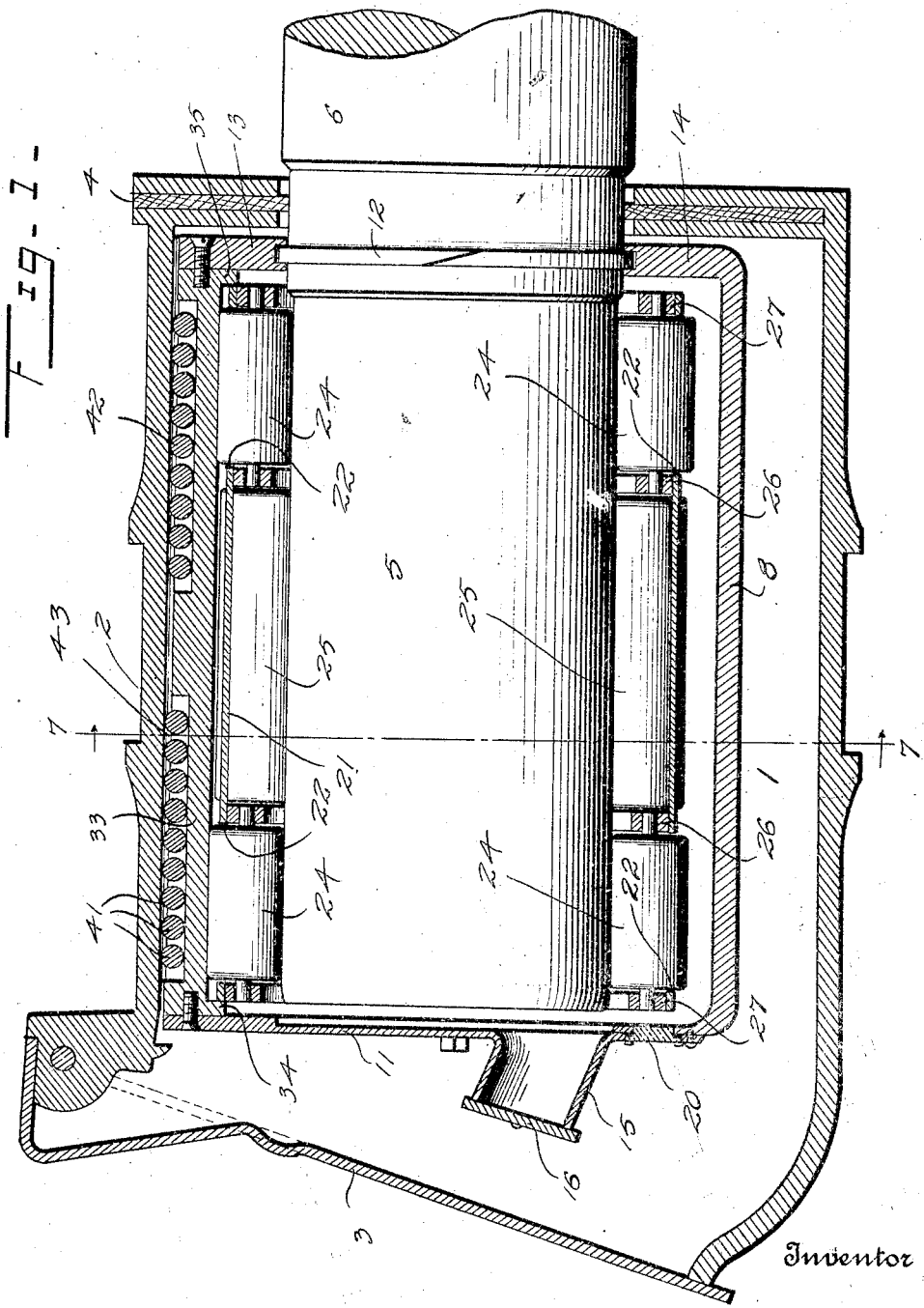
Figure 1 is a longitudinal, vertical, central sectional view through a journal box, showing the journal in elevation, and the device of my invention in section and in operative position on the journal.
Figure 2:
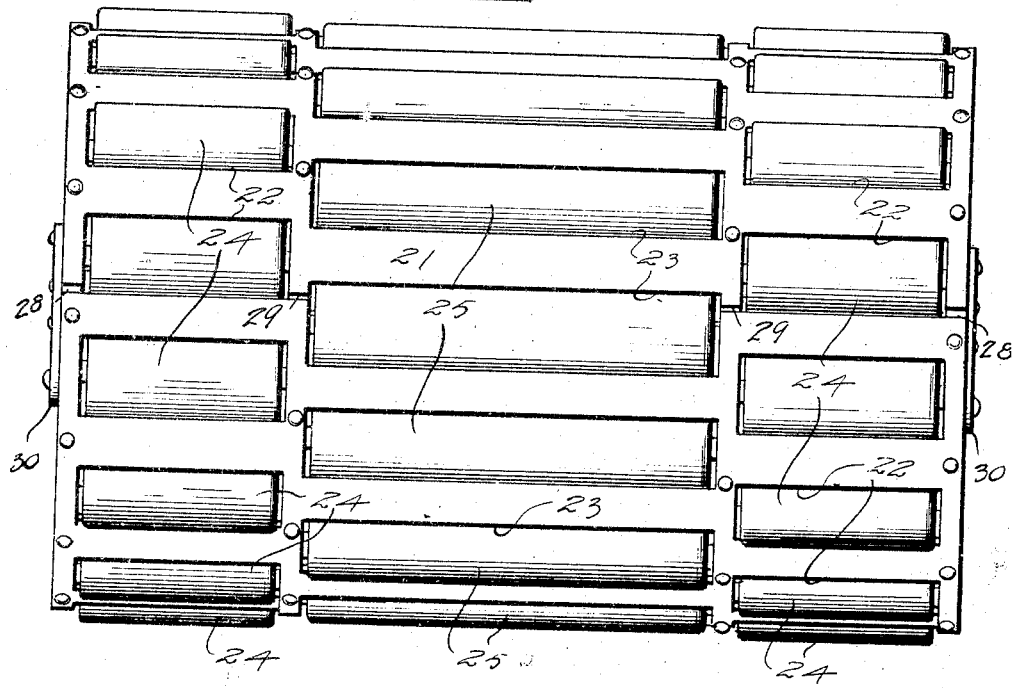
Fig. 2 is a side view in elevation of the roller bearing member, detached.

In order that the invention may be readily understood, I have utilized the standard form of car journal box 1 which carries the load of the car on its top plate 2 and slides vertically as usual between the guides (not shown) of the underframe of the car. The customary lid 3 and dust guard 4 are present, the former to provide access to the interior of the box and the latter surrounding and protecting the journal end 5 of the axle 6. In using the device of the invention, the grease and waste for lubricating and packing commonly employed, are eliminated, and an oil cell is substituted, which is preferably a metallic structure comprising the two sections 7 and 8 that are joined by the removable bolts 9 extending along each side of the cell and passing through complementary ears 10 similar to a hinge joint, but of course the two bolts hold the sections rigidly together. The bolts are passed through the front plate 11, which is screwed to the cell, and after passing through the alined ears 10 are threaded into the last ear at the rear of the cell, and the cell is retained on the journal through the instrumentality of a divided or snap ring 12 that is sprung into an annular groove in the axle co-acting with the grooved back plate 13 of the cell, and the rear upwardly projecting flange 14 of the lower section that is similarly grooved to fit over the ring. The back plate is screwed to the upper section of the cell, and these alined, grooved, members form an annular recess for the ring 12 to turn in and through these grooved members the ring retains the cell against axial movement on the journal.

The front plate 11 of the cell is fashioned with a filling spout 15 provided with a close fitting closure or gate 16, pivoted to swing at 17 and equipped with a handle 18 that springs down behind the receiver or hook 19 of the spout, and through the spout the lubricating oil is provided for the cell. A glass plate or window 20 may be utilized to inspect the interior of the oil cell to ascertain the quantity of lubricant therein, and this window is fixed in the front plate 11 of the cell.

The cell is supported on the journal through the roller bearing device, including the slotted cylinder or cage 21 which surrounds the journal, which, as shown is a metallic cylinder of proper size and length provided with longitudinal slots as 22, 22, arranged in series at the ends of the cylinder or sleeve, and alined, and between these two series of slots is arranged an intermediate series of slots 23 that are comparatively longer than the end slots and "staggered" or offset out of alinement with them. Through these slots the rollers 24, and 25, protrude, slightly beyond the outer periphery of the cage or sleeve and associated with the two series of end slots and the intermediate slots respectively, the rollers being of exactly the same diameter, but differing in length to fit the slots.

The long bearing rollers 25 are journaled in two intermediate rings 26, 26, spaced equidistant between the ends of the cage and also from the longitudinal center thereof, and the shorter rollers are journaled between these intermediate rings and the end rings 27, 27, all the rings, four in number, being secured, as by rivets or screws passing through the cage and into the rings at the interior of the cage.

Figure 3:
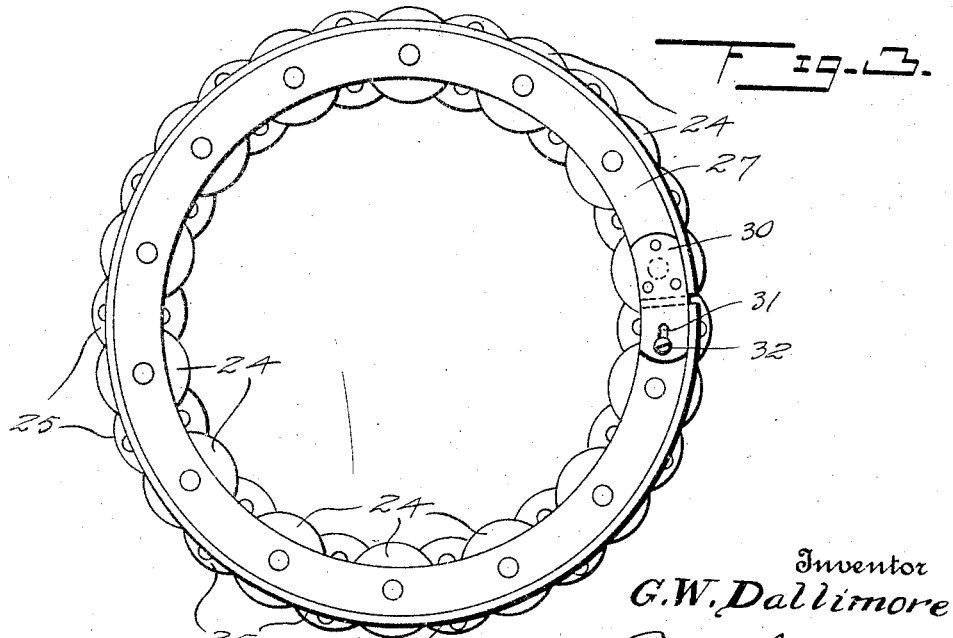
Fig. 3 is an end view of the roller bearing member.

Preferably the cage is of resilient material, and at its ends the cage may be divided as at 28, 28, while intermediate divisions 29, 29 may also be provided thus permitting an adjustment of the annular cage about the journal in order to secure close and uniform contact of the rollers with the journal. At the ends of the cage, connecting straps or plates 30, formed with slots 31, are rigidly secured at one end to the divided ring 27, and the other end of each strap with its slot 31 may be secured to the adjoining end of the divided ring 27 (see Fig. 3) by means of the set screw 32 in the end of the divided ring. Thus all four of the bearing rings 26, 26, and 27, 27, and the cage itself, are divided and their lines of division co-axial with the journal, so that the cage with its rollers may be adjusted to best position with regard to the journal to secure highest efficiency, and the coupling straps 30, 30 will prevent the resiliency of the material of the cage from springing it to an excessively open position.

At each end of the top plate 33, which extends horizontally across the upper section 7 of the cell, is fashioned a downwardly arranged centrally located lug, as 34 and 35 which lugs are designed to retain the cage within the cell and preserve its proper relation within the cell.

In the outer face of each side of the journal box cell, near the top, is provided a groove 36 extending substantially the full length of the cell, and these grooves are adapted to receive, each, a pair of screws or bolts 37 threaded horizontally through the side walls of the box and alined with the grooves, in order that the bearing cell may be held suspended in proper position while the cage is being applied or removed. If the cell is to be removed, it will of course be necessary to back out the screws or bolts sufficiently to free the cell from them.

Oil is supplied to the cell through the spout, up to a normal level just below the outer periphery of the journal, and the cell is rendered tight in its joints to prevent escape of the oil from the cell by overlapping, downwardly projecting flanges 38 at each side of the upper section or half of the cell fitting within the lower section at the rear end of the cell. Tongue and groove joints are provided on plates 14 and 13 respectively as indicated by dotted lines 39 and 40 in Fig. 7, and at the front end by plate 11 with gasket if necessary. Gaskets are provided around the window glass in the front of the cell and other necessary precautions may be taken, in the construction of the cell to prevent escape of oil, as usual.

End thrust and longitudinal movement of the bearing on the journal are provided for by the presence of two series of rollers 41 and 42, located transversely of the journal, between the top plate 33 of the cell and the bearing plate or top plate 2 of the journal box, and are held in place by side bars 43 secured to the top of the cell and extending along the upper side edges thereof. These two series of rollers carry the load between the journal and the bearing or top plate of the box, and the snap ring 12 retains the cell on the journal, as before explained. By this construction and arrangement of parts, the slightest axial movement of the journal, inwardly or outwardly with relation to the car, due to rounding curves by the car, worn flanges on the wheels, etc., is absorbed and the limit of movement of the cell before encountering the journal box at either end thereof, may be set so that any ordinary end thrust will be absorbed.

The end thrust bearing rollers are lubricated, preferably, with a grease that will not run under ordinary conditions.

It should be noted that the bearing rollers are so spaced or staggered in their cage, that at no time is a single roller subjected to the peak load, therefore a greater load may be carried than can be accomplished when the rollers are not staggered, and on account of the offset position of the rollers the possibility of their balking or jamming when taking the load is eliminated, and by the same disposition of parts, they will leave the load without strain.

In the assemblage of the parts of the device, assuming the snap ring 12 is in place on the journal, the cell is first placed inside the journal box, in sections, the lower section 8 being placed in the bottom below the journal, and the upper section with the back plate thereon, is suspended by its grooves and the screws as explained. The cage with its rollers is then sprung over the journal and the two bolts 9 are placed in position and screwed up, and finally the front plate 11 is screwed home.

By the utilization of my improved roller journal bearing and oil box, the usual wool and cotton packing is eliminated, a continuously, well supplied lubricant is furnished to the journal and friction is so greatly reduced that vast savings in transportation will result.

What I claim is—

1. The combination with the journal having a retaining ring thereon, of a closed lubricant cell on the journal engaged by said ring, a cage within the cell and rollers carried by said cage and interposed between the cell and journal.

2. The combination with the journal having a retaining ring and a lubricant cell engaged by said ring, of bearing rollers between the journal and cell, a journal box incasing the cell, and end thrust bearing rollers between the journal box and cell.

3. The combination with the journal, of a sectional inclosing cell for lubricant and roller bearings between the cell and journal, and retaining means on the journal directly engaging and holding the cell against lateral movement.

4. The combination with the journal, of an inclosing cell and roller bearings between the cell and journal, the rear open wall of the cell being grooved, and a retaining ring on the journal engaging said grooved rear wall.

5. The combination with the journal of a cell retained thereon, said cell comprising upper and lower sections and a hinge bolt at each side of the cell securing the sections together, a cage and roller bearings between the cell and journal, and the upper section of the cell having end retaining flanges for the cage.

6. The combination with the journal having a fixed retaining ring, of a cell formed of upper and lower sections and hinge bolts at each side of the cell joining the sections, bearing rollers between the cell and journal, a journal box, and end thrust bearing rollers between the box and cell.

GEORGE W. DALLIMORE.